United States Patent
Wenning

(10) Patent No.: US 6,500,548 B2
(45) Date of Patent: Dec. 31, 2002

(54) TRANSPARENT OR PIGMENTED POWDER COATING MATERIALS WITH CROSSLINKERS COMPRISING HYDROXYALKYLAMIDES AND BLOCKED NONAROMATIC POLYISOCYANATES

(75) Inventor: Andreas Wenning, Nottuln (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 09/790,496

(22) Filed: Feb. 23, 2001

(65) Prior Publication Data

US 2001/0021748 A1 Sep. 13, 2001

(30) Foreign Application Priority Data

Feb. 25, 2000 (DE) .................................... 100 08 928.3

(51) Int. Cl.[7] ..................... C09D 133/02; C09D 167/02
(52) U.S. Cl. ................. 428/423.1; 428/428; 428/522; 427/195; 427/385.5; 524/507; 524/539; 525/124; 525/440; 525/934
(58) Field of Search ................. 525/124, 440, 525/934; 427/385.5, 195; 428/423.1, 482, 522; 524/507, 539

(56) References Cited

U.S. PATENT DOCUMENTS

| | | |
|---|---|---|
| 4,076,917 A | 2/1978 | Swift et al. |
| 4,101,606 A | 7/1978 | Cenci et al. |
| 4,889,890 A | 12/1989 | Kerr et al. |
| 4,988,767 A | 1/1991 | Pettit, Jr. |
| 5,538,759 A | 7/1996 | Hoppe et al. |
| 5,811,190 A | 9/1998 | Laas, et al. |
| 5,874,173 A | 2/1999 | Wenning |
| 5,916,629 A | 6/1999 | Wenning et al. |
| 6,063,497 A | 5/2000 | Wenning et al. |
| 6,156,863 A | 12/2000 | Wenning |
| 6,291,624 B1 * | 9/2001 | Ardand ........................ 528/45 |
| 6,306,967 B1 | 10/2001 | Spyrou |
| 6,342,576 B1 | 1/2002 | Wenning |

FOREIGN PATENT DOCUMENTS

| | | |
|---|---|---|
| DE | 19 57 483 | 5/1971 |
| DE | 21 05 777 | 8/1972 |
| DE | 22 61 065 | 6/1974 |
| DE | 23 08 015 | 9/1974 |
| DE | 23 25 826 | 12/1974 |
| DE | 24 37 130 | 2/1976 |
| DE | 25 42 191 | 4/1976 |
| DE | 26 28 760 | 1/1978 |
| DE | 27 07 660 | 8/1978 |
| DE | 27 38 270 | 3/1979 |
| DE | 29 16 201 | 10/1980 |
| DE | 29 29 150 | 2/1981 |
| DE | 30 07 679 | 9/1981 |
| DE | 36 00 766 | 7/1987 |
| DE | 198 50 970 | 5/2000 |
| EP | 0 322 807 | 7/1989 |
| EP | 0 322 834 | 7/1989 |
| EP | 0 496 208 | 7/1992 |
| EP | 0 524 500 | 1/1993 |
| EP | 0 536 085 | 4/1993 |
| EP | 0 957 082 | 11/1999 |
| EP | 1 061 069 | 12/2000 |
| GB | 391066 | 4/1933 |
| WO | WO 95/01406 | 1/1995 |

OTHER PUBLICATIONS

W. Siefken, Annalen der Chemie, vol. 562, pp. 75–136, "Mono–Und Polyisocyanate", 1949.

A. Wenning, Creative Advances in Coatings Technology, Paper 19, pp. 253–273, "Weather–Stable Low–Gloss Powder Coatings", May 26, 1999.

Z.W. Wicks, Jr., Progress in Organic Coatings, vol. 9, pp. 3–28, "New Developments in the Field of Blocked Isocyanates", 1981.

Z.W. Wicks, Jr., Progress in Organic Coatings, vol. 3, pp. 73–99, "Blocked Isocyanates", 1975.

\* cited by examiner

Primary Examiner—Patricia A. Short
(74) Attorney, Agent, or Firm—Oblon, Spivak, McClelland, Maier & Neustadt, PC

(57) ABSTRACT

Transparent or pigmented powder coating materials with crosslinkers comprising hydroxyalkylamides and blocked nonaromatic polyisocyanates.

16 Claims, No Drawings

TRANSPARENT OR PIGMENTED POWDER COATING MATERIALS WITH CROSSLINKERS COMPRISING HYDROXYALKYLAMIDES AND BLOCKED NONAROMATIC POLYISOCYANATES

BACKGROUND OF THE INVENTION

1. Field of the Invention

The invention relates to transparent or pigmented powder coating materials with crosslinkers comprising hydroxyalkylamides and blocked nonaromatic polyisocyanates and acidic polymers, said materials possessing reduced susceptibility to pinholing.

2. Discussion of the Background

Powder coating materials based on triglycidyl isocyanurate (TGIC) and acid-functional polyesters produce corrosion-resistant and weather-stable powder coatings. EP 0536 085 describes, however, how expensive processes or a relatively large and thus likewise expensive purification effort are required in order to prepare the TGIC in solid form. Moreover, TGIC is classified by the European Community as a category II mutagen ("is regarded as causing mutations") and as of May 31, 1998 has required labeling as "toxic".

Toxicologically unobjectionable and at the same time more reactive as well are β-hydroxyalkylamide crosslinkers. In U.S. Pat. Nos. 4,076,917 and 4,101,606, β-hydroxyalkylamides are combined with polymers having at least one carboxyl or anhydride function, in particular with polyacrylates, to form powder coating materials. U.S. Pat. No. 4,988,767 describes powder coating materials based on hydroxyalkylamides and acidic acrylate resins. EP 0 322 834 describes thermosetting powder coating materials composed of β-hydroxyalkylamides and polyesters containing acid groups. These coatings with β-hydroxyalkylamide crosslinkers are highly weatherstable, very flexible, hard, and chemical-resistant. Especially at relatively high coat thicknesses, however, the water which is released on crosslinking leads to pinholing.

U.S. Pat. No. 4,889,890 describes hybrid powder coating materials. The acidic polymers they contain are cured with polyepoxides such as, for example, polyglycidyl ethers of aromatic phenols. To increase the crosslinking density, a β-hydroxyalkylamide is used. These hybrid powder coating materials afford good corrosion protection but are unsuited to use outdoors owing to a lack of weathering stability.

Thometzek et al. in 5th Nuremberg Congress, Congress Papers, Volume 1, 251–273 (1999) describe powder coating materials comprising a hydroxy-functional polyester resin, a hydroxyalkylamide, and a bifunctional crosslinker which in addition to blocked isocyanate groups contains carboxyl groups. These powder coating materials are suitable for obtaining matte rather than glossy coatings.

It is an object of the present invention to provide powder coating materials which give highly glossy, flexible, light-stable and weather-stable coatings of low susceptibility to pinholing.

SUMMARY OF THE INVENTION

It has surprisingly been found that coatings comprising acidic polymers and β-hydroxyalkylamide crosslinkers, especially at relatively great coat thicknesses, are markedly less susceptible to pinholing if blocked polyisocyanate crosslinkers are added as an additional component. Flexibility, gloss, reactivity, and weather stability remain at the traditional high level of polyester/hydroxyalkylamide or polyurethane powder coating materials.

According to another embodiment of the present invention is a method of coating a surface by applying a powder coating material and curing.

According to another embodiment of the present invention is a coated article obtained by applying a powder coating material and curing.

These and other embodiment of the present invention are made possible by a transparent or pigmented powder coating materials with crosslinkers comprising hydroxyalkylamides and blocked polyisocyanates, comprising:

A) from 20 to 99% by weight of at least one acidic polymer;
B) from 1 to 25% by weight of at least one β-hydroxyalkylamide;
C) from 0.05 to 10% by weight of at least one blocked nonaromatic polyisocyanate having an NCO functionality $\geq 2$;
D) from 0 to 50% by weight of at least one pigment and/or inorganic filler;
E) from 0 to 5% by weight of at least one adjuvant or auxiliary.

DETAILED DESCRIPTION OF THE PREFERRED EMBODIMENTS

Suitable non-limiting examples of acidic polymers A) for preparing the powder coating materials of the invention include polyester resins and acrylate resins.

The acidic polyesters preferably possess a glass transition temperature (Tg) in the range from 30 to 85° C. and an acid number of from 20 to 80 mg KOH/g. They may be prepared in principle by a condensation reaction of aliphatic polyols and/or cycloaliphatic polyols with aliphatic and/or aromatic polycarboxylic acids and anhydrides. Polyesters of this kind are described, for example, in EP 0 322 807, DE 198 50 970 or WO 95/01406.

The acidic acrylate resins possess an acid number in the range from 10 to 250 mg KOH/g and a melting point of from 60 to 160° C. They are prepared in principle by copolymerizing a monomer mixture comprised of a) from 0 to 70 parts by weight of methyl (meth)acrylate,
b) from 0 to 60 parts by weight of (cyclo)alkyl esters of acrylic acid and/or methacrylic acid having 2 to 18 carbon atoms in the alkyl or cycloalkyl radical,
c) from 0 to 90 parts by weight of vinylaromatic compounds, and
d) from 0 to 60 parts by weight of olefinically unsaturated carboxylic acids, the sum of the parts by weight of components a) to d) being 100.

The monomers b) preferably comprise (cyclo)alkyl esters of acrylic or methacrylic acid having 2 to 18 carbon atoms in the (cyclo)alkyl radical. Non-limiting examples of suitable and, respectively, preferably suitable monomers b) are ethyl (meth)acrylate, n-propyl (meth)acrylate, isopropyl (meth)acrylate, n-butyl (meth)acrylate, isobutyl (meth)acrylate, tert-butyl (meth)acrylate, 2-ethylhexyl (meth)acrylate, cyclohexyl methacrylate, neopentyl methacrylate, isobornyl methacrylate, 3,3,5-trimethylcyclohexyl methacrylate and stearyl methacrylate.

Non-limiting examples of suitable monomers c) include styrene, vinyltoluene and ethylstyrene Non-limiting examples of d) are acrylic and methacrylic acid, which are also used with preference, and also crotonic acid, itaconic acid, fumaric acid, maleic acid and citraconic acid.

The copolymers may be prepared by copolymerizing the exemplified monomers a) to d) in accordance with customary free-radical polymerization processes, such as solution, emulsion, bead or bulk polymerization, for example.

The monomers may be copolymerized at temperatures of from 60 to 160° C., preferably from 80 to 150° C., in the presence of free-radical initiators and, if desired, molecular weight regulators.

The carboxyl-functional acrylate copolymers are preferably prepared in inert solvents. Non-limiting examples of suitable solvents are aromatic compounds, such as benzene, toluene, xylene; esters, such as ethyl acetate, butyl acetate, hexyl acetate, heptyl acetate, methylglycol acetate, ethylglycol acetate, methoxypropyl acetate; ethers, such as tetrahydrofuran, dioxane, diethylene glycol dimethyl ether; ketones, such as acetone, methyl ethyl ketone, methyl isobutyl ketone, methyl n-amyl ketone, methyl isoamyl ketone; or any desired mixtures of such solvents.

The copolymers may be prepared continuously or batchwise. A normal procedure is to meter the monomer mixture and the initiator into a polymerization reactor continuously and at a uniform rate and at the same time to draw off continuously the corresponding amount of polymer. In this way it is possible, preferably, to prepare copolymers which are virtually uniform in chemical terms. Chemically nearuniform copolymers may also be prepared by running the reaction mixture at a constant rate into a stirred vessel without taking off the polymer.

Alternatively, a portion of the monomers, by way of example, may be introduced as an initial charge in solvents of the stated type and the remaining monomers and auxiliaries, separately or together, may be introduced into this initial charge at the reaction temperature. In general, the polymerization takes place under atmospheric pressure, but may also be conducted at pressures of up to 25 bar. The initiators are preferably used in amounts of from 0.05 to 15% by weight, based on the overall amount of the monomers.

Suitable initiators are customary free-radical initiators, such as aliphatic azo compounds, for example such as azodiisobutyronitrile, azobis-2-methylvaleronitrile, 1,1'-azobis-1-cyclohexanenitrile and 2,2'-azobisisobutyric acid alkyl esters; symmetrical diacyl peroxides, such as acetyl, propionyl or butyryl peroxide for example, benzoyl peroxides substituted by bromine, nitro, methyl or methoxy groups, lauryl peroxides; symmetrical peroxydicarbonates, e.g., tert-butylperbenzoate; hydroperoxides, such as tert-butyl hydroperoxide, cumene hydroperoxide , for example; dialkyl peroxides, such as dicumyl peroxide, tert-butyl cumyl peroxide or di-tertbutyl peroxide.

To regulate the molecular weight of the copolymers it is possible to use customary regulators in the preparation. Examples that may be mentioned include mercaptopropionic acid, tert-dodecyl mercaptan, n-dodecyl mercaptan or diisopropylxanthogen disulfide. The regulators may be added in amounts of from 0.1 to 10% by weight, based on the overall amount of the monomers.

The copolymer solutions obtained in the copolymerization can then be passed on without further workup to the evaporation or devolatilization process, in which the solvent is removed, for example, in a devolatilizing extruder or spray dryer at from about 120 to 160° C. under a vacuum of from 100 to 300 mbar and the copolymers for use in accordance with the invention are recovered.

Polyacrylates of this kind are described, for example, in U.S. Pat. No. 4,988,767.

As polycarboxyl compounds it is of course also possible to use mixtures of two or more substances.

The β-hydroxyalkylamides B) are known in principle and are described, for example, in EP 0 957 082, U.S. Pat. No. 4,076,917 and U.S. Pat. No. 4,101,606. The structure may be described as follows:

Formula I

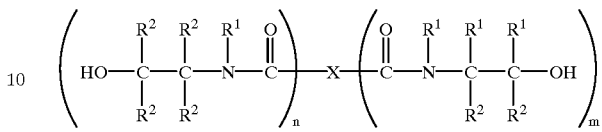

where

X is a chemical bond, hydrogen or a monovalent or polyvalent organic group derived from saturated, unsaturated or aromatic hydrocarbon groups and having 1–24 carbon atoms, or these heteroatom-substituted radicals;

$R^1$ is hydrogen, an alkyl, alkenyl, aryl or aralkyl radical having 1–24 carbon atoms, these heteroatom-substituted radicals or

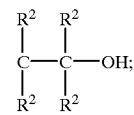

where $R^2$ is as defined below, $R^2$ independently at each occurrence is identical or different radicals selected from hydrogen, an alkyl, aryl, aralkyl or alkenyl radical having 1–24 carbon atoms, or these heteroatom-substituted radicals;

n is an integer from 1 to 1 0;

m is an integer from 0 to 2; and n+m≧2.

Preferred compounds used to prepare the powder coating materials of the invention are prepared in accordance with EP 0 957 082 and specified on page 4 of the A2 text [0026].

The ratio of the carboxyl-containing polymers A) to the β-hydroxyalkylamide compound B) is generally chosen such that the ratio of carboxyl groups to hydroxyl groups is from 0.6:1 to 1.6:1.

The nonaromatic blocked polyisocyanate C) having an NCO functionality≧2 is known in principle. As the polyisocyanate component it is possible to use any aliphatic, (cyclo)aliphatic, cycloaliphatic or heterocyclic polyisocyanate having at least two isocyanate groups, and mixtures thereof. Polyisocyanates of this kind are specified, for example, in Houben-Weyl, Methoden der Organischen Chemie, Volume 14/2, page 61 ff., and in J. Liebigs Annalen der Chemie, Volume 562, pages 75 to 136. Representative examples of the polyisocyanates are aliphatic isocyanates such as alkylene isocyanates, e.g., ethylene diisocyanate, propylene diisocyanate, tetramethylene diisocyanate, pentamethylene diisocyanate, 2-methylpentamethylene 1,5-diisocyanate (MPDI), hexamethylene diisocyanate (HDI), trimethylhexamethylene 1,6-diisocyanate (TMDI), especially the 2,2,4 and the 2,4,4 isomer, and technical mixtures of both isomers, decamethylene diisocyanate and dodecamethylene diisocyanate, and also cycloalkylene isocyanates, e.g., 1,3-cyclopentyl diisocyanate, 1,2-cyclohexyl diisocyanate, 1,4-cyclohexyl diisocyanate, ω,ω'-diisocyanato-1 ,4-methylcyclohexane, ω,ω'-diisocyanato-1,3-dimethylcyclohexane, 1-methyl-2,4- diisocyanatocyclohexane, 4,4'-methylenebis(cyclohexyl isocyanate), norbornane diisocyanate (NBDI) and 3,3,5-trimethyl-1-isocyanato-3-isocyanatomethylcyclohexane (isophorone diisocyanate, IPDI).

Polyisocyanates C) also include for the purposes of the present invention those adducts obtained by reacting the polyisocyanates with customary chain extenders of isocyanate chemistry such as water, polyols and polyamines. Compounds of this kind are listed, for example, in DE-A 27 07 660. The chain extender is used in a substoichiometric amount with regard to the polyisocyanate, i.e., the reaction product contains on average at least two isocyanate groups.

Polyols suitable for chain extension are described, for example, in DE 19 57 483, 21 05 777, 25 42 191 and 27 38 270. Of the polyamines which are suitable for chain extension, mention should be made, for example, of ethylenediamine, 1,2-propylenediamine, 1,3-propylenediamine, 1,2-butylenediamine, 1,3-butylenediamine, 1,4-butylenediamine, and also the hexamethylenediamines, which may also carry one or more $C_1$–$C_4$ alkyl radicals. It is also possible to use disecondary or primary/secondary diamines, as may be obtained, for example, in a known manner from the corresponding diprimary diamines by reacting them with a carbonyl compound, such as a ketone or aldehyde, for example, and then hydrogenating the products, or by the addition reaction of diprimary diamines onto acrylic esters.

Also highly advantageous is molecular enlargement of the exemplified polyisocyanates by trimerization, carbodiimidization, allophanate formation, and biuretization, as described in accordance with the information, for example, of GB Patent 1 391 066, DE-AS 23 25 826, 29 16 201, 29 29 150 and 36 44 684 (trimerization), DE-A 36 00 766 (carbodiimidization), EP 0 496 208 and EP 0 524 500 (allophanate formation), and DE-AS 22 61 065, 23 08 015, 24 37 130 and 30 07 679 (biuretization).

The blocking agents which may be used in principle to block the polyisocyanates include, for example, phenols such as phenol and p-chlorophenol, for example, alcohols such as benzyl alcohol, for example, oximes such as acetone oxime, methyl ethyl ketoxime, cyclopentanone oxime, cyclohexanone oxime, methylisobutyl ketoxime, methyl tert-butyl ketoxime, diisopropyl ketoxime, diisobutyl ketoxime and acetophenone oxime, for example, N-hydroxy compounds such as N-hydroxysuccinimide and hydroxypyridines, for example, lactams such as ε-caprolactam, for example, CH-acidic compounds such as acetoacetic esters and malonic esters, for example, amines such as diisopropylamine, for example, heterocyclic compounds having at least one heteroatom, such as mercaptans, piperidines, piperazines, pyrazoles, imidazoles, triazoles and tetrazoles, for example, β-hydroxy acid esters such as glycolic esters and hydroxamic esters such as benzyl methacrylohydroxamate, for example. A compilation may be found, for example, in Zeno W. Wicks, Jr., Progress in Organic Coatings 3 (1975) 73–79, 9 (1981) 3–28.

Particularly suitable blocking agents are acetone oxime, methyl ethyl ketoxime and acetophenone oxime, ε-caprolactam, ethyl acetoacetate, diethyl malonate, diisopropylamine, 3,5-dimethylpyrazole, 1,2,4-triazole, butyl glycolate and benzyl methacrylohydroxamate. It is of course also possible to use mixtures of these blocking agents.

The ratio of the β-hydroxyalkylamide compound B) to the blocked nonaromatic polyisocyanate C) is generally chosen such that the ratio of hydroxyl groups to isocyanate groups is from 0.5:1 to 2:1.

In order to prepare the ready-to-use powder coating materials, the acidic polymer A), the β-hydroxyalkylamide B), the nonaromatic blocked polyisocyanate C), together, if desired, with pigments or fillers D) such as $TiO_2$ or barium sulfate, for example and further customary powder coatings adjuvants or auxiliaries E) such as leveling agents such as polybutyl acrylate or degassing agents such as benzoin or catalysts such as dibutyltin dilaurate (DBTL) or $C_1$–$C_{18}$ zinc, aluminum or titanium carboxylate salts or aluminum oxides or zinc oxides, for example, are mixed. All ingredients of the powder coating material are homogenized in the melt. This can be done in suitable apparatus, such as treatable compounders, for example, but preferably by extrusion, in the course of which the temperature ought not to exceed an upper limit of 140° C. After cooling to room temperature and appropriate comminution, the extruded mass is ground to the ready-to-spray powder. This powder may be applied to appropriate substrates in accordance with the known processes, such as by means of electrostatic or tribostatic powder spraying or of fluidized bed sintering, with or without electrostatic assistance, for example. Following powder application, the coated workpieces are cured by heating them at a temperature of from 140 to 220° C. for from 60 to 5 minutes.

In comparison to the powders known to date based on acidic polymers and β-hydroxyalkylamides, the powders of the invention are distinguished by a reduced susceptibility to pinholing, especially at relatively high coat thicknesses.

The subject matter of the invention is illustrated below with reference to examples.

EXAMPLES

1 Raw materials used 1.1 Acidic polymer A)

The acidic polymer used was the polyester GRILESTA® P 7617 (acid number 35 mg KOH/g, EMS-lnventa AG).

1.2 β-Hydroxyalkylamide B)

The β-hydroxyalkylamide B) used was the polyester VESTAGON® EP-HA 320 (OH number 668 mg KOH/g, Degussa-Hüls AG).

1.3 Blocked polyisocyanate C)

Polyisocyanates C) used were C1) VESTAGON® B 1530 (caprolactam-blocked polyisocyanate abduct, NCO number 15.3%, Degussa-Hüls AG) and C2) VESTAGON® EP-B 1613 (triazoleblocked polyisocyanate abduct, NCO number 15.1 mg KOH/g, Degussa-Hüls AG).

2 Powder coating materials

General preparation procedure

The comminuted products, i.e., acidic polyester, β-hydroxyalkylamide compound, blocked polyisocyanate, leveling agent, and catalysts if desired, are intimately mixed in an edge runner mill, together if appropriate with the white pigment, and the mixture is then homogenized in a twin-screw extruder from Berstorff up to a maximum of 140° C. After cooling, the extrudate is fractionated and ground with a pin mill to a particle size of <100 µm. The powder prepared in this way is applied to degreased, optionally pretreated iron panels using an electrostatic powder spraying unit at 60 kV and the panels are baked in a convection oven at temperatures between 140 and 220° C.

The abbreviations in the table below have the following significations:

CT=coat thickness in µm

EI=Erichsen indentation (DIN 53 156)

CH=crosshatch testing (DIN 53 151)
GG 60° angle=Gardner gloss measurement (ASTM-D 5233)
Imp. rev.=impact reverse in inch·lb

TABLE 1

Pigmented powder coating materials

| Example Formulation* | 1 | 2 | 3 | 4 | 5 Comparative |
|---|---|---|---|---|---|
| GRILESTA ® P 7617 | 60.41 | 60.32 | 60.41 | 60.32 | 60.5 |
| VESTAGON ® EP-HA 320 | 3.19 | 3.21 | 3.19 | 3.04 | 3.2 |
| VESTAGON ® B 1530 | 0.10 | 0.17 | — | — | — |
| VESTAGON ® EP-B 1360 | — | — | 0.10 | 0.38 | — |
| Notes: | 35% by weight TiO₂ (white pigment), 1.0% by weight Resiflow PV 88, 0.3% by weight benzoin | | | | |
| Film data | | | | | |
| CT | 81–87 | 67–77 | 83–87 | 93–115 | 61–80 |
| CH | 0 | 0 | 0 | 0 | 0 |
| GG 60° angle | 90 | 92 | 93 | 93 | 92 |
| EI | >10 | >10 | >10 | >10 | >10 |
| Imp. rev. | >160 | >160 | >160 | >160 | 140 |
| Note | few PH²⁾ | no PH²⁾ | few PH²⁾ | no PH²⁾ | C¹⁾, many PH²⁾ |
| Curing: | 180° C./20 minutes | | | | |

¹⁾C = cratering, ²⁾PH = pinholes, *amounts in % by weight

Obviously, numerous modifications and variations of the present invention are possible in light of the above teachings. It is therefore to be understood that within the scope of the appended claims, the invention may be practiced otherwise than as specifically described herein.

This application is based on German patent application 10008928.3 filed in the German Patent Office on Feb. 25, 2000, the entire contents of which are hereby incorporated by reference.

What is claimed is:

1. A powder coating material with crosslinkers comprising hydroxyalkylamides and blocked polyisocyanates, comprising:
A) from 20 to 99% by weight of at least one acidic polymer;
B) from 1 to 25% by weight of at least one β-hydroxyalkylamide;
C) from 0.05 to 10% by weight of at least one blocked nonaromatic polyisocyanate having an NCO functionality ≧2;
D) from 0 to 50% by weight of at least one of a pigment, an inorganic filler or a mixture thereof
E) from 0 to 5% by weight of at least one adjuvant or auxiliary,
wherein said acidic polymer A) is (1) at least one polyester resin having a glass transition temperature in the range from 30 to 85° C. and an acid number of from greater than 20, to 80 mg KOH/g, or (2) at least one acrylate resin having an acid number in the range from greater than 20, to 250 mg KOH/g and a melting point of from 60 to 160° C., or a mixture of (1) and (2).

2. The powder coating material of claim 1, wherein said acidic polymer A) is any desired mixture of the at least one polyester resin and the at least one acrylate resin.

3. The powder coating material of claim 1 wherein said β-hydroxyalkylamide B) has the formula I

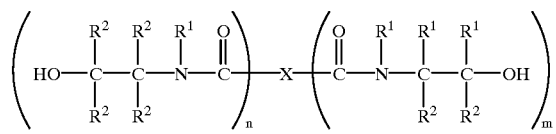

Formula I where
X is a chemical bond, hydrogen or a monovalent or polyvalent organic group derived from saturated, unsaturated or aromatic hydrocarbon groups and having 1–24 carbon atoms, or these heteroatom-substituted radicals;
$R^1$ is hydrogen, an alkyl, alkenyl, aryl or aralkyl radical having 1–24 carbon atoms, these heteroatom-substituted radicals or

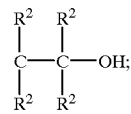

where $R^2$ is defined as below,
$R^2$ independently at each occurrence is identical or different radicals selected from hydrogen, an alkyl, aryl, aralkyl or alkenyl radical having 1–24 carbon atoms, or these heteroatom-substituted radicals;
n is an integer from 1 to 10;
m is an integer from 0 to 2; and
n+m≧2.

4. The powder coating material of claim 1, wherein said nonaromatic blocked polyisocyanate C) comprises at least one compound from the group consisting of aliphatic, (cyclo)aliphatic, cycloaliphatic and heterocyclic polyisocyanates having at least two isocyanate groups.

5. The powder coating material of claim 4, wherein said nonaromatic blocked polyisocyanate C) comprises as polyisocyanate component 2-methylpentamethylene 1,5-diisocyanate, 2,2,4-trimethylhexamethylene 1,6-diisocyanate, 2,4,4-trimethylhexamethylene 1,6-diisocyanate (TMDI), norbornane diisocyanate, isophorone diisocyanate, the isocyanurate of 2-methylpentamethylene 1,5-diisocyanate, the isocyanurate of hexamethylene diisocyanate or the isocyanurate of isophorone diisocyanate.

6. The powder coating material of claim 1 wherein said polyisocyanate C) is blocked with acetone oxime, methyl ethyl ketoxime or acetophenone oxime, ε-caprolactam, ethyl acetoacetate, diethyl malonate, diisopropylamine, 3,5-dimethylpyrazole, 1,2,4-triazole, butyl glycolate or benzyl methacrylohydroxamate.

7. The powder coating material of claim 1 which comprises polyisocyanates C) which have been chain-extended and/or molecularly enlarged by trimerization, carbodiimidization, allophanate formation and biuretization.

8. The powder coating material of claim 1 wherein auxiliaries and adjuvants present are selected from the group consisting of leveling agents, degassing agents, catalysts and a mixture thereof.

9. The powder coating material of claim 8, which comprises catalysts in a concentration of from 0.03 to 1.0% by weight, based on the total amount of powder coating material.

10. The powder coating material of claim 9, wherein said catalysts is selected from the group consisting of aluminum carboxylate salts, titanium carboxylate salts, aluminum oxides, zinc oxides, organotin compounds and a mixture thereof.

11. The powder coating material of claims 1 wherein the ratio of the acidic polymers A) to the β-hydroxyalkylamide compound B) is chosen such that the ratio of carboxyl groups to hydroxyl groups is from 0.6:1 to 1.6:1.

12. The powder coating material of claim 1 wherein the ratio of the β-hydroxyalkylamide compound B) to the blocked nonaromatic polyisocyanate C) is chosen such that the ratio of hydroxyl groups to isocyanate groups is from 0.5:1 to 2.0:1.

13. The powder coating material of claim 1, wherein said powder coating material is transparent.

14. The powder coating material of claim 1, wherein said powder coating material is pigmented.

15. A method of coating comprising:
i) applying to a surface, a powder coating material comprising:
  A) from 20 to 99% by weight of at least one acidic polymer
  B) from 1 to 25% by weight of at least one β-hydroxyalkylamide;
  C) from 0.05 to 10% by weight of at least one blocked nonaromatic polyisocyanate having an NCO functionality $\geq 2$;
  D) from 0 to 50% by weight of at least one of a pigment, an inorganic filler or a mixture thereof;
  E) from 0 to 5% by weight of at least one adjuvant or auxiliary; and
ii) curing said powder coating material,
wherein said acidic polymer A) is (1) at least one polyester resin having a glass transition temperature in the range from 30 to 85° C. and an acid number of from greater than 20, to 80 mg KOH/g, or (2) at least one acrylate resin having an acid number in the range from greater than 20, to 250 mg KOH/g and a melting point of from 60 to 160° C., or a mixture of (1) and (2).

16. A coating obtained by a process comprising:
i) applying to a surface, a powder coating material comprising:
  A) from 20 to 99% by weight of at least one acidic polymer
  B) from 1 to 25% by weight of at least one β-hydroxyalkylamide;
  C) from 0.05 to 10% by weight of at least one blocked nonaromatic polyisocyanate having an NCO functionality $\geq 2$;
  D) from 0 to 50% by weight of at least one of a pigment, an inorganic filler or a mixture thereof;
  E) from 0 to 5% by weight of at least one adjuvant or auxiliary; and
ii) curing said powder coating material,
wherein said acidic polymer A) is (1) at least one polyester resin having a glass transition temperature in the range from 30 to 85° C. and an acid number of from greater than 20, to 80 mg KOH/g, or (2) at least one acrylate resin having an acid number in the range from greater than 20, to 250 mg KOH/g and a melting point of from 60 to 160° C., or a mixture of (1) and (2).

* * * * *